(12) United States Patent
Harnisch et al.

(10) Patent No.: US 7,940,376 B2
(45) Date of Patent: May 10, 2011

(54) REAL TIME SYNTHETIC APERTURE RADAR PROCESSING SYSTEM AND METHOD

(75) Inventors: Bernd Harnisch, Noordwijkerhout (NL); Pascal Bourqui, Sainte-Foy (CA); Alain Bergeron, Sainte-Foy (CA)

(73) Assignee: European Space Agency, Paris Cedex (FR)

( * ) Notice: Subject to any disclaimer, the term of this patent is extended or adjusted under 35 U.S.C. 154(b) by 0 days.

(21) Appl. No.: 11/795,099

(22) PCT Filed: Jan. 10, 2005

(86) PCT No.: PCT/IB2005/001106
§ 371 (c)(1),
(2), (4) Date: Oct. 26, 2007

(87) PCT Pub. No.: WO2006/072813
PCT Pub. Date: Jul. 13, 2006

(65) Prior Publication Data
US 2008/0084551 A1    Apr. 10, 2008

(51) Int. Cl.
*G01C 3/08* (2006.01)
(52) U.S. Cl. ......................... 356/4.01; 356/5.1
(58) Field of Classification Search ........ 356/4.01–5.15, 356/28, 141.1; 342/25 R, 25 F; 382/103, 382/106, 107
See application file for complete search history.

(56) References Cited

U.S. PATENT DOCUMENTS

| | | | | |
|---|---|---|---|---|
| 4,108,538 A | * | 8/1978 | Felstead | 359/564 |
| 4,355,311 A | * | 10/1982 | Frosch et al. | 342/25 A |
| 4,929,953 A | | 5/1990 | Brandstetter | |
| 5,488,504 A | | 1/1996 | Worchesky et al. | |
| 5,566,382 A | | 10/1996 | Worchesky et al. | |

OTHER PUBLICATIONS

Kozma, A, et al., Tilted-plane optical processor, Applied Optics USA, Aug. 8, 1972, pp. 1766-1777, vol. II, No. 8, ISSN: 0003-6935.
Tomiyasu, Kiyo, Tutorial Review of Synthetic Aperture Radar (SAR) With Applications to Imaging of the Ocean Surface, May 1978, Proceedings of the IEEE, vol. 66, No. 5.
International Search Report and Written Opinion dated Nov. 10, 2005 for Application No. PCT/IB2005/001106.
Response to Office Action dated Jul. 31, 2007 for EP 05 718 518.3.
Office Action dated Jun. 19, 2008 for EP 05 718 518.3.
Response to Office Action dated Jun. 19, 2008 for EP 05 718 581.3.
Office Action dated Nov. 25, 2009 for EP 05 718 518.3.
Response to Office Action dated Nov. 25, 2009 for EP 05 718 518.3.

* cited by examiner

*Primary Examiner* — Isam Alsomiri
(74) *Attorney, Agent, or Firm* — Frost Brown Todd LLC

(57) ABSTRACT

A real time SAR processing system for processing synthetic aperture radar (SAR) return signals and a method for real time processing of SAR return signals. The real time SAR processing system for processing synthetic aperture radar return signals comprises a light source (1) for generating a coherent, plane electromagnetic wave; light modulation means (2) for modulating the incident wave according to the radar return signals and outputting a modulated wave; and optical processing means (3) for submitting the modulated wave to an optical signal processing for radar image reconstruction. The light modulation means (2) comprises a plurality of addressable pixels (30) which are controlled based on the radar return signals. Light detection means (4) for detecting the processed wave and generating a corresponding electrical radar image signal are provided.

15 Claims, 4 Drawing Sheets

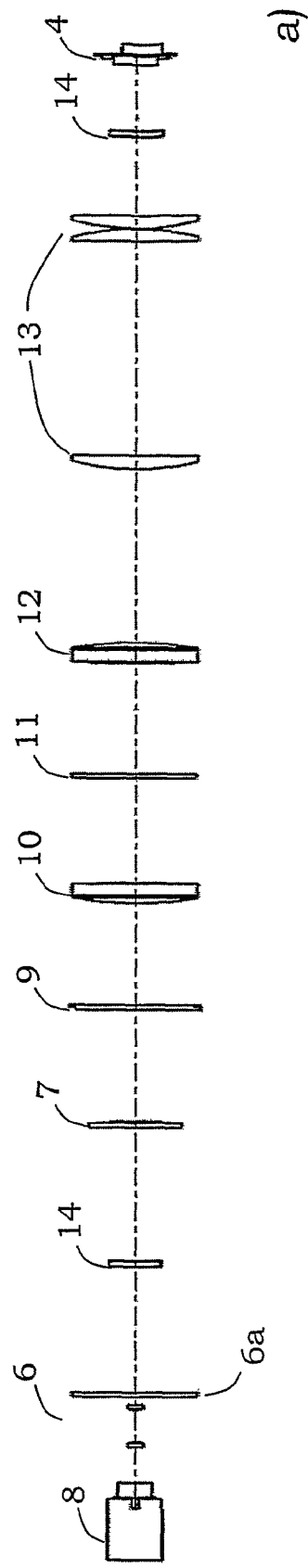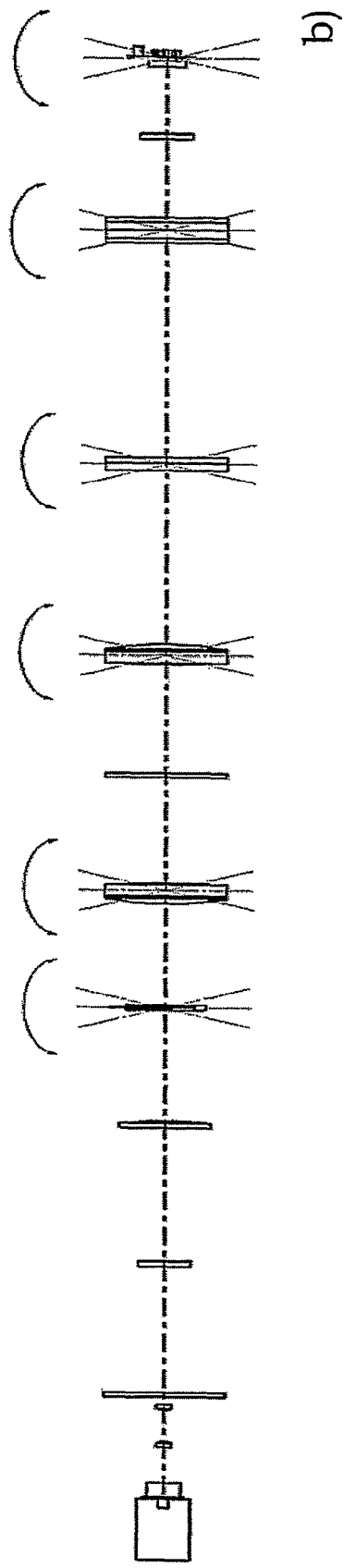
Fig. 2

REAL TIME SYNTHETIC APERTURE RADAR PROCESSING SYSTEM AND METHOD

CROSS REFERENCE TO RELATED APPLICATIONS

This U.S. Nonprovisional Patent Application is a national phase application of PCT Patent Application No. PCT/IB05/01106, filed Jan. 10, 2005, entitled "Real Time Synthetic Aperture Radar Processing System and Method," which is incorporated herein by reference.

BACKGROUND

This invention relates to a real time SAR processing system for processing synthetic aperture radar return signals and a method for real time processing of SAR return signals.

Synthetic aperture radar (SAR) is a technique widely used in aerial and space reconnaissance. An aircraft or a spacecraft carries a side looking antenna and transmits radar pulses in a direction different from the flight path. A slant range coordinate is defined in a direction normal to the flight path and an azimuth coordinate is defined in the direction along the flight path. The range resolution of the SAR is a function of the effective transmitted pulse width, and a high resolution in range is achieved by the use of very short transmitted pulses and/or using chirped pulses. The azimuth resolution is set by the dimensions of the antenna. By increasing the antenna diameter, the azimuth resolution can be increased, being limited, however, by the size and weight of the antenna carried by the aircraft or spacecraft. In conventional radar systems, especially at long ranges, high resolution in azimuth would require the need for huge antennas.

In synthetic aperture radar, the radar platform moves along a straight path in a direction oblique to the target to be imaged. The antenna is carried along the flight path to a sequence of positions in which the SAR system, at each position, radiates a pulse and receives and stores the reflected return signal. SAR images are the superposition of many backscatter pulses within the range and azimuth of the SAR antenna footprint. The stored data is then processed to create the image of the illuminated target area. A high resolution in the azimuth direction is attained by applying a specialized signal processing technique without the necessity of physically large antennas. In effect, a large aperture antenna is synthesized. Since the high resolution in azimuth is achieved by the synthetic antenna and a coherent processing of the phase history, the amplitude and phase history of the reflected signal of a scene has to be recorded. Thus, a coherent phase history of the pulse return signal is generated and recorded. An overview and details of SAR is given in "Tutorial Review of Synthetic Aperture Radar (SAR) With Applications to Imaging of the Ocean Surface" by Kiyo Tomiyasu, Proceedings of the IEEE, Vol. 66, No. 5, May 1978, which is included in this application by reference.

SAR signal processing can be mathematically described as a correlation or a filtering process on all the coherent radar signal returns stored during an (synthetic) aperture time. This requires large data storage and huge data processing capabilities. In the beginning of SAR technology, the computer technology was not powerful enough to process the data amount of SAR images effectively. Therefore, mostly optical processing solutions of the SAR images have been applied. In a conventional optical processing system, the raw SAR data is recorded on a photosensitive material (film) for storage and subsequent optical processing. A reflective range pulse from the radar receiver is written, by means of a cathode ray tube, as a range trace across the width of the signal film. Between pulses the film is advanced by small increments. Thus, a position across the film width corresponds to a range position, and a position along the film length corresponds to a position along the track of the radar platform. The signal amplitude and the phase history are recorded on film after phase coherent addition of the received signal and a reference signal of the radar system. The film is recorded during acquisition of the image and must be (chemically) developed before providing the input for the optical processor for the imaginary construction. This prevents real-time processing and requires chemical film treatment that usually cannot be performed in an aircraft or a spacecraft.

Due to the large amount of data an electronic signal processing of the radar return signals depends on high performance computers and, therefore, an onboard processing on satellites is usually not possible. Furthermore, the large amount of data acquired cannot be effectively compressed so that the large amount of uncompressed data needs to be transmitted from a satellite to a ground based processing centre for further processing. This requires large bandwidth for the data transmission.

In order to allow a real-time processing of synthetic aperture radar signals, U.S. Pat. No. 4,929,953 proposes to optically store raw SAR data on erasable and reusable photosensitive materials. The SAR return signal is written in radial traces on a photosensitive rotatable disk that rotates in synchronicity to the aircraft velocity. The recorded SAR data of several radar pulses is then illuminated by coherent light for the optical processing to reconstruct the SAR image. Next, the disk with the data stored thereon rotates into an erase zone, where the data is erased by high intensity light that changes the recording medium back to its original transparent condition ready for recording of another radial trace of SAR return data. Due to the movable recording medium, which needs to be rotated in exact synchronism with radar pulses and flight parameters, a complex control of the disk rotation is necessary. In addition, the recording of the raw SAR data in radial traces requires a complex shaped aspherical lens for compensation of the radial geometry of the recording medium. Furthermore, due to the moving parts and the thermoplastic recording media, the durability of the proposed real-time SAR processing system is limited so that it is not suitable for a permanent application in a spacecraft.

It is an object of the present invention to provide a real-time SAR processing system and method with reduced data processing requirements and enhanced durability.

This object is achieved by the subject-matter according to the independent claims The dependent claims refer to preferred embodiments of the invention.

SUMMARY

A real-time processing system for processing synthetic aperture radar returning signals may comprise a light source for generating a coherent electromagnetic wave, light modulation means for modulating the incident wave according to the radar return signals and outputting a modulated wave, and optical processing means for processing the modulated wave for radar image reconstruction.

The light modulating modulation means may comprise a plurality of addressable pixels that are controlled based on the radar return signals. By controlling the individual pixels of the light modulation means, a phase and/or amplitude modulation of the incident wave may be performed so that the modulated wave bears the information of the radar return signals.

The reflected range pulses received by the radar receiver may be directly applied to control the transmittance of the individual pixels. Optionally, the return signal is digitised (analogue/digital (A/D) converted) and processed, e.g. filtered, before being applied as control signals to the individual pixels.

The received return signals may also be coherently added with a radar reference signal (e.g. the radar carrier signal) to convert the phase history in an amplitude control signal for controlling the light modulation means. This allows a coherent processing of the phase history of the signals received by the SAR by means of light intensity modulation. Thus, a spatial pattern in the light modulation means similar to that of a Fresnel zone plate in optics is obtained.

The optical processing means may comprise suitable lenses for radar image reconstruction so that a reconstructed image of the scenery illuminated by the radar pulses of the synthetic aperture is generated. When a parallel light beam of coherent light is passed through the at least one lens of the optical processing means and the spatial pattern generated by the light modulation means (being similar to a Fresnel zone plate), the light beam is brought to a focus. This may be considered to be a Fourier transformation process. By providing the suitable lenses for optical processing, the two-dimensional radar signal pattern generated by the light modulation means is imaged on a detection plane, wherein the signals of all targets differing in range but laying in one azimuth direction will appear on one line across the detection plane.

Light detection means may be provided for detecting the processed wave imaged to the detection plane and generating a corresponding electrical processed image signal. The processed image signal may be stored for further processing, compressed, and/or transmitted to a ground station. Depending on the used detector end the application, the processed image signal may be analogue/digital converted and/or processed, e.g., filtered.

The synthetic aperture radar processing system according to the present invention has the advantage that it allows a real time processing of the SAR raw data. The computation intensive image processing, such as the Fourier transformation, is performed by the optical processing means without the need for high performance computers. The electrical radar response signals are input into the optical processor by the light modulation means that modulate a coherent wave in a similar way as a developed film having the SAR raw data recorded thereon. However, no chemical film processing is necessary so that the system may be permanently deployed in a spacecraft. As opposed to the prior art, no moving parts, no mechanical synchronization of a rotatable disk and no reusable photosensitive materials are required. Thus, the durability of the system is enormously improved. Since the reconstructed image of the radar target area is converted to an electrical processed image signal, it can be easily processed by conventional analogue or digital signal processing techniques.

Preferably, the addressable pixels of the light modulation means are arranged in a rectangular array (matrix) and the light modulation means modulate the incident wave according to a two-dimensional radar signal pattern. One dimension of the radar signal pattern may correspond to SAR range data and the other dimension may correspond to SAR azimuth signal history. Thus, a radar signal pattern (phase and amplitude) corresponding to radar response signals for the duration of the integration or dwell time (equivalent to the synthetic aperture) is represented (displayed) based on a rectangular geometry. Accordingly, no complex lens within optical processing is necessary to compensate for distortions introduced, e.g., by a radial arrangement of range tracks.

The light modulation means may comprise a pixel drive circuit for writing the SAR range data corresponding to a radar pulse response in a column or a line of pixels. A transmittance of a pixel may be controlled based on an amplitude and/or phase value of a corresponding radar return signal value. If amplitude and phase of the incident wave are simultaneously modulated by the light modulation means (complex modulation), a complex field distribution is introduced in the processor, providing an increase in diffraction efficiency. In addition, this avoids the addition of the reference signal (carrier frequency) and its filtering in the optical processor. A complex modulation would therefore simplify the optical processing and the signal preparation before the signal is applied to the light modulation means. Alternatively, amplitude and phase of the incident wave may also be modulated in separate steps resulting in a complex modulation, too.

According to a preferred embodiment of the invention, the light modulation means comprise a micro display or a spatial light modulator (SLM) for a spatial phase and/or amplitude modulation of the incident wave. For instance, a liquid crystal type micro display or spatial light modulator may be used to modulate the electromagnetic wave based on the radar return signals. The SAR range data corresponding to individual radar pulse responses may be written in pixel columns or lines of the micro display or spatial light modulator. Micro displays or spatial light modulators usually have electrically addressable pixels so that the electric radar pulse response signal received from the radar receiver may be applied to control the transmittance of an addressed pixel. The spatial light modulator is preferably arranged as a liquid crystal display, a micro mirror SLM, an electro-optic SLM, or a magneto-optic SLM.

According to a preferred embodiment, a complex addressable SLM is used for modulating the coherent light. A complex addressable SLM allows an amplitude modulation and a phase modulation of the incident light. As an alternative, two SLMs positioned next to each other, one for amplitude modulation and one for phase modulation, allows to introduce a complex field distribution to the incident wave. This provides an increase of the diffraction efficiency and avoids the need for adding a carrier frequency to the radar return signals and filtering the carrier frequency in the optical processor.

A display buffer memory for temporarily storing the SAR raw data may be provided. The SAR range data of a radar pulse response may be input to the display buffer, wherein radar pulse response data for one radar pulse may be input simultaneously into the display buffer memory, which may hold radar pulse response data of a plurality of radar pulses, preferably corresponding to the integration or dwell time of the synthetic aperture. SAR range data corresponding to a subsequent radar pulse response may be written to an adjacent column or line of pixels. The display buffer memory may be configured to operate as a FIFO (first in-first out buffer).

The display buffer memory is preferably connected to the pixel drive circuit which may access the stored SAR data and write it to the respective columns or lines of pixels. The data in the display buffer memory may be shifted by one pixel column or a plurality of columns for each processing cycle corresponding to a radar pulse response. Alternatively, the stored radar return signals for multiple radar pulses (corresponding to the integration or dwell time) may be output from the display buffer and supplied by the pixel drive circuit to the individually addressable pixels of the light modulation means so that a radar signal pattern including phase history information for at least the range data of one radar pulse (one azimuth increment) is applied to the incident wave for modulation.

The light detection means may comprise a light sensitive area sensor, such as a CCD or CMOS array. The sensor is preferably arranged in the detection plane perpendicular to the optical axis. A light sensitive area sensor allows the detection of a plurality of image lines in the detection plane, each corresponding to range data for one increment of azimuth resolution.

Preferably, the light detection means comprises a light sensitive line sensor, such as a CCD or CMOS line, for detecting the processed wave corresponding to one increment of azimuth resolution. The electrical processed image signal generated by the light sensitive line sensor for one radar signal pattern displayed by the light modulation means includes the SAR range data corresponding to one radar pulse response. Alternatively an area detector array can be used.

An image buffer to store detected electrical processed image signals (preferably after A/D conversion) may be provided for collecting the data of the processed image signal corresponding to an entire scene illuminated by the radar. The line or area sensor data may be input into the image buffer and written in columns or lines of buffer memory.

According to a preferred embodiment, the light source comprises a laser and/or a collimating lens for collimating the coherent laser light. Such an arrangement generates a plane electromagnetic wave to be submitted to the light modulation means.

The light source may further comprise a spatial filter to improve the quality of the image. A polarizer may be provided if the spatial light modulator requires polarized light. For instance, a micro mirror SLM would not require the use of a polarizer. It is also possible to place a polarizer at other positions in the optical path (e.g. in front of the detector) if necessary to ensure a proper light polarisation.

The optical processing means may comprise at least one cylindrical lens to selectively focalise the azimuth or range field. The cylindrical lens(es) is preferably used together with a spherical lens to provide focussing power in the azimuth direction.

The optical processing means may further comprise at least one conical lens for providing focussing power in the range direction. The conical lens produces images of all targets differing in range, but lying in one azimuth direction. These images appear on one line on a detector plane, where preferably the light sensitive line sensor is located. The task of the conical lens is also to compensate for the chirp (varying radar carrier frequency) along the range direction and/or for the range phase factor along the azimuth direction.

At least one spherical lens for imaging the processed wave to the detector plane of the detection means may be provided. The spherical lens operates also with the cylindrical and/or conical lens to perform their respective tasks.

The optical processing means may further comprise a diffraction stop means to remove the diffraction pattern of the light source caused by the structure of the micro display. The diffraction stop also removes a DC component (if present) and/or stray light in the system. If a carrier frequency is used for modulating the wave, the diffraction stop removes the negative and higher orders of the carrier frequency.

The light modulation means and/or the light detection means may be tilted with respect to the optical axis. By tilting the planes of the micro display/SLM and/or of the detector plane, the deployment of a conical lens for compensating for the inherent tilting of the azimuth plane can be avoided. In this case, the conical lens will become a cylindrical lens and the optical processing means comprise a combination of spherical and cylindrical lenses. This has the advantage that no conical lens, which is expensive in manufacturing, is needed. The exact tilt values depend on the SAR configuration and on the optical design selected. This spherical lens(es) combined with the cylindrical lens(es) and the tilted angles of the light modulation means and/or the light detection means provide a coalignment of the focalization planes for both azimuth and range field.

These and other potential objects, features and advantages of the present invention will appear more fully from the following description of examples for embodiments of the invention. It is to be understood, however, that the scope of the present invention is not limited by any one embodiment shown in the accompanying drawings, wherein

BRIEF DESCRIPTION OF THE DRAWINGS

FIG. 2 shows an exemplary optical configuration of a real time SAR processing system according to the invention for chirped and non-chirped signals;

DETAILED DESCRIPTION

Figure 1:
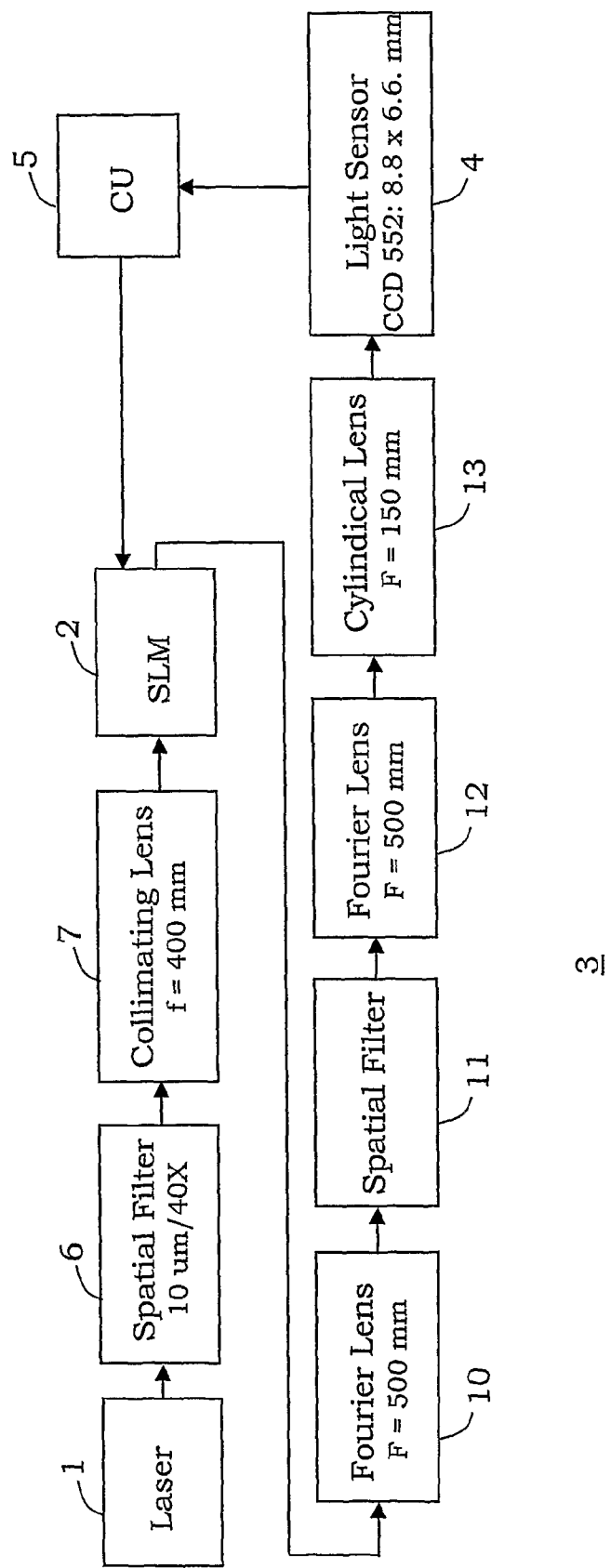
FIG. 1 shows schematically an embodiment of the present invention.

FIG. 1 shows schematically an embodiment of the present invention. A light source 1 generates a coherent, plane electromagnetic wave to illuminate light modulation means 2 for modulating the incident wave according to radar return signals received from a control unit 5. Between the light source 1 and the light modulation means 2, a collimation system comprising a collimating lens 7 and a spatial filter 6 is arranged. An optional polarizer may be placed before the light modulation means 2, too.

The light modulation means 2 is configured as a spatial light modulator (SLM), which can be embodied as a liquid crystal display, a micro mirror SLM, an electro-optic SLM, a magneto-optic SLM, etc. The SAR raw data, i.e., the radar return signals, are used to drive addressable pixels of the light modulation means 2 so that a radar signal pattern appears on the light modulation means 2 and an amplitude and/or phase modulation is performed by the light modulation means 2. One dimension of the two-dimensional radar signal pattern corresponds to SAR range data while the other dimension corresponds to SAR azimuth signal history. Thus, the azimuth signal history for SAR range data corresponding to at least one integration or dwell time is applied simultaneously for the modulation of the incident wave. If a coherent processing of the SAR data is performed by the light modulation means 2, i.e., a complex modulation including amplitude and phase modulation, there is no need to add the radar carrier frequency to the received return signals.

The optical processing means 3 for reconstructing the radar image on the detection plane of a light detection means 4 comprises diffraction stop means to remove the diffraction pattern of the light source 1 caused by the light modulation means 2, a DC component (if present), and/or artefacts of the carrier frequency included in the pixel drive signal (if present). The diffraction stop means comprises a (spherical) Fourier lens 10 and a spatial filter 11. The spatial filter 11 includes an aperture (square or rectangular) that is centred at the carrier frequency location in the Fourier plane. However, it is also possible to use an active diffraction stop wherein the aperture is variably displaced (like a square on a display) to accommodate for various carrier frequencies, and expanded or reduced to accommodate for various bandwidths.

The optical processor 3 further comprises a (spherical) Fourier lens 12 and a cylindrical lens 13 to provide focussing power in the azimuth direction. The optical processor 3 produces an image of all targets different in range but lying in an azimuth direction on one line of the detector plane associated with the light detection means 4.

The light detection means 4 may be embodied by a CMOS line detector, a CCD or a CMOS array or other appropriate line or array light sensitive sensors which detect the processed wave in the detection plane and generate a corresponding electrical signal. In other words, the image obtained is acquired with an array detector or, alternatively, the result can be acquired sequentially line by line using a light sensitive sensor, such as a CCD line or CMOS line.

The electrical signal of the processed image is transmitted to the control unit 5 for storing and/or electrical signal processing. Since the processed SAR image data may be compressed, the bandwidth requirements for transmitting the SAR image data may be reduced. This is particularly useful for SAR systems mounted in spacecrafts, where the SAR image data needs to be transmitted via a radio link to a ground based station.

Compared to the conventional SAR optical signal processing, the first film is replaced in the invention by a micro display or a spatial light modulator. The SAR range data is written directly in the micro display column by column and the overall image is shifted so that, after completing a new column, the content of the micro display is shifted by one column. Alternatively, multiple columns may be changed in the same frame refresh period. Furthermore, the second film of a conventional SAR system is replaced by a light sensitive sensor.

FIG. 2 shows an exemplary optical configuration of a real time SAR processing system according to the invention for chirped and non-chirped signals. FIG. 2A shows a top view and FIG. 2B a side view of the configuration. The distances, focal lengths and tilting angles may be properly selected to accommodate for chirped and non-chirped signals. In this embodiment, the light source is a laser 8 and a SLM 9 is used as light modulation means.

The first two components after the laser 8 in FIG. 2 perform focalisation of the laser beam to further enter a pinhole 6a (the first lens collimates and the second focuses). The laser beam such focalised is filtered with the pinhole 6a to provide a Gaussian illumination. So the two components coupled with the pinhole 6a represent the spatial filter 6. A polarizer 14 follows to polarize the light beam for the SLM 9.

Each radar impulse is transferred to an electrical signal which is fed into the SLM 9 such that intensity variations of the radar back signal are transferred into transmission variations of the SLM pixels, which causes amplitude variations along the plane transmitting optical wave. This optical wave is processed (two-dimensional Fourier transformation) by a dedicated set of lenses and imaged on the detector 4.

The optical processing is performing a two-dimensional Fourier transformation of a two-dimensional image on the micro display or SLM 9 (corresponding to the SAR response) to a one-dimensional line on the detector (corresponding to the processed SAR image). The shifting of the SAR image column by column on the SLM 9 shifts the 2D input at the optical processor. Thus, using a two-dimensional sensor provides multiple azimuth elevations from the SAR raw data at the same time.

The SLM 9, the spherical lenses 10, 12, the cylindrical lenses 13 and/or the detector 4 may be tilted to compensate for the inherent tilting of the azimuth plane. The actual tilt values depend on the SAR configuration and on the optical design selected. By tilting some of the components, the deployment of a conical lens is avoided. The choice of the distances, focal lengths and tilting angles are further selected to synchronize the range and azimuth focal planes. These parameter values will usually differ if the system works with chirped signals or non-chirped signals. Details on the proper selection of the parameter values are disclosed in "Tilted-Plane Optical Processor" by A. Kozma et al., Applied Optics, Vol. 11, No. 8, p. 1766, 1972.

Figure 3:
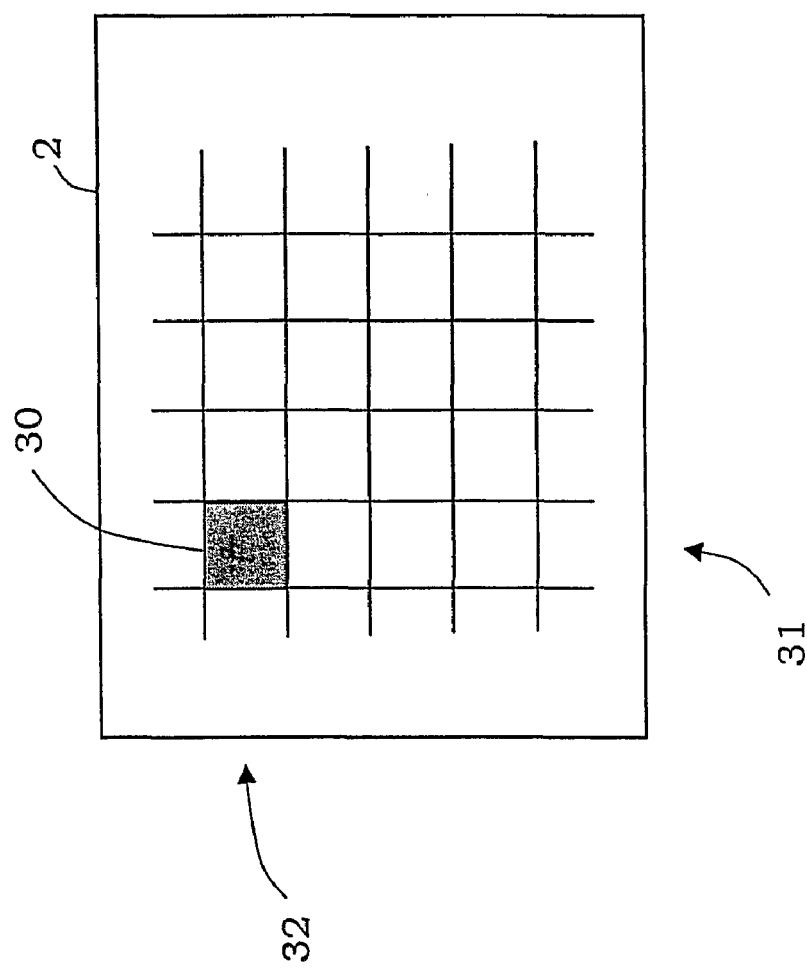
FIG. 3 shows schematically the arrangement of pixels in columns and lines of a light modulation means.

FIG. 3 shows schematically the arrangement of pixels 30 in columns 31 and lines 32 of a light modulation means 2. The individual pixels 30 are addressable and their transmittance for incident light is controlled based on the radar return signals such that the amplitude and/or phase of the passing modulated wave correspond to the radar echo.

Figure 4:
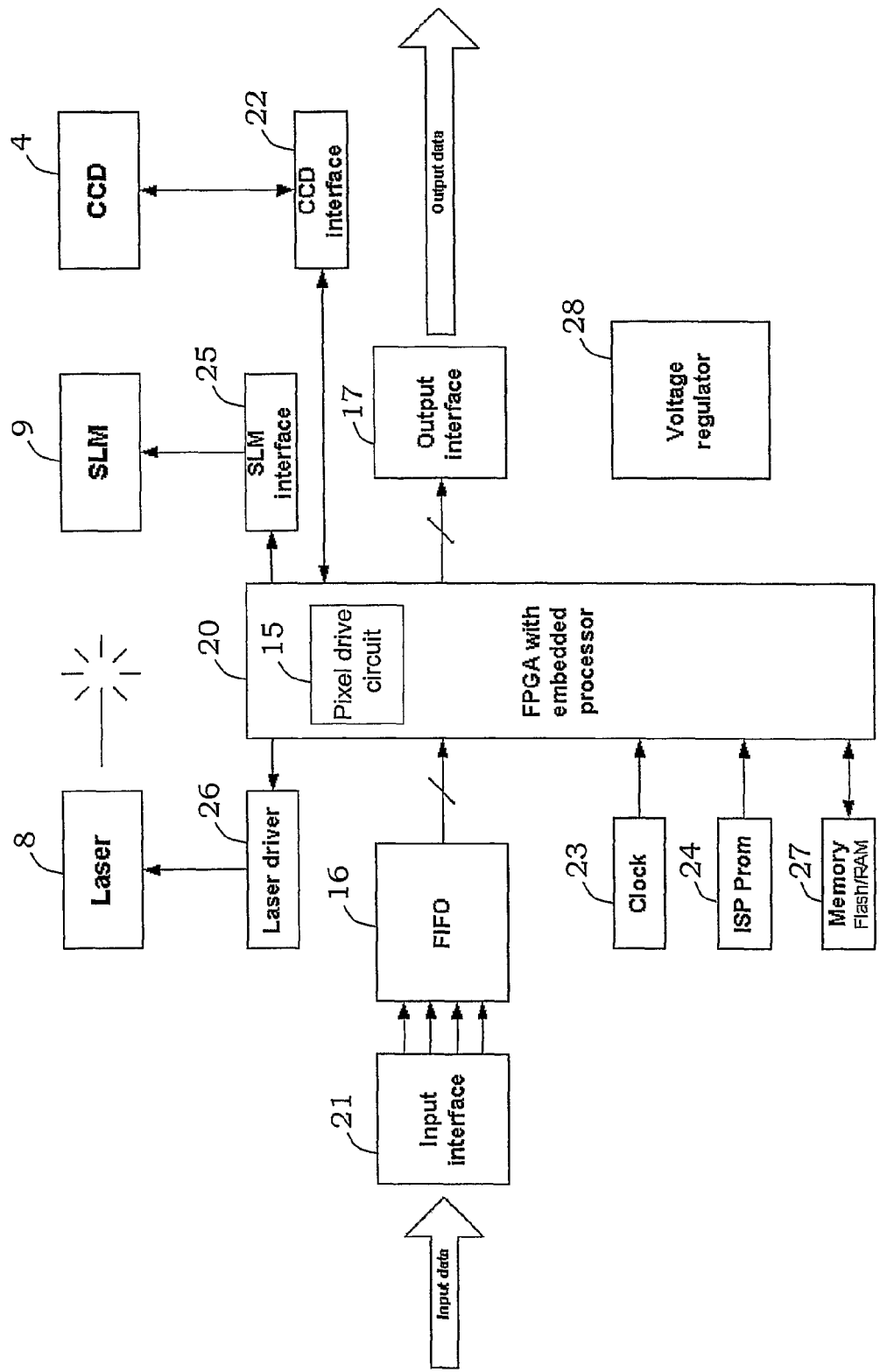
FIG. 4 shows schematically the electrical components of a real time SAR processing system according to an embodiment of the invention.

FIG. 4 shows schematically the electrical components of a real time SAR processing system according to an embodiment of the invention. The SAR raw data, after an analogue-to-digital conversion, is supplied to an input interface 21 which writes the received data into the display buffer memory 16. A controller 20, which may be embodied as an FPGA with embedded processor, receives a clock signal from a clock 23. The controller 20 performs data formatting and synchronization for a display on the SLM 9. There is further provided a ROM memory 24 and a RAM memory 27 for storing control programs and data for the controller 20. A voltage regulator 28 provides the necessary voltages to all components.

The controller 20 controls a laser driver 26 for driving the laser light source 8. The SLM 9 is driven by an SLM interface 25 which is also controlled by the controller 20. The processed wave is detected by the CCD sensor 4 which generates the electrical signal of the processed image. A CCD interface 22 controls the CCD sensor 4 and inputs the processed image signal which is delivered, e.g., as digital values, to the controller 20. An output interface 17 comprises an image buffer to store the processed image signals.

The operation of the embodiment is explained next. For the acquisition, a new range array of data (corresponding to a specific azimuth and multiple ranges) is acquired each time the SAR platform moves by the minimal azimuth increment. The two-dimensional SAR information (SAR raw data) is composed by multiple range array acquisitions buffered in the display buffer memory 16 configured as a FIFO. With time, the memory buffer 16 contains enough of range array data to fill in the complete two-dimensional radar signal pattern displayed by the SLM 9. The control unit 20 comprises a pixel drive circuit 15 for writing the SAR range arrays in a column (or alternatively a line) of pixels in the SLM 9. The SLM pixel array can be updated by changing one range column at the time, fed by the FIFO 16. Alternatively, the pixel drive circuit 15 can, at each frame, refresh multiple range arrays corresponding to multiple azimuth increments (i.e., refreshing the full SLM 9). As such, if the SAR data is seen as a pixel raster, this raster is displayed on the SLM 9, each range array corresponding to a column and incremental azimuth corresponding to a line (or vice versa).

Each echo of the radar corresponds to a single pixel. To achieve real time processing, the global processing rate (or display rate) of the SLM 9 must match the global sampling rate of the SAR system. However, with the use of the FIFO 16, the radar sampling rate does not have to exactly match the pixel refresh (writing) rate of the SLM 9 as long as the global sampling and processing rates match together.

The pixel refreshing frequency of the SLM 9 (in pixels per second) has to be larger than the sampling rate of the radar to achieve real time processing. That is, the data must go out as fast as or faster than it goes in.

The spatial resolution (in meter) of the SAR processing system according to the invention is given by the following equation.

$$\text{Resolution} = \text{range-to-target} \times \text{wavelength} \div (2 \times \text{sampling distance} \times \text{SLM dimension}),$$

wherein:
range-to-target=distance spacecraft/aircraft to target;
wavelength=wavelength of the radar (i.e. directly related to the frequency of the radar);
sampling distance=the synthetic antenna length; and
SLM dimension=pixels over one axis of the SLM.

The spatial resolution of the SAR processing system is further illustrated by the following example: if the range to target is 1000 km, the wavelength of the SAR is 0.057 m (5.3 GHz), the sampling distance is 5 m, and the SLM dimension on one axis is 1000 pixels, then the resolution of the system is 5.22 m. In order to achieve the maximum resolution, the dimension of the light detection means (i.e., the CCD) has to match the SLM dimension, i.e., in the above example, the CCD sensor needs 1000 pixels, too.

In the state of the art, SAR data processing is performed with high performance computers and work stations which cannot be implemented efficiently on satellites. Therefore, a large amount of data has to be transmitted with current standard technology. The present invention replaces the films used in the conventional SAR technology with new technologies such as a SLM/micro display and a light sensitive sensor (CCD or CMOS). This allows an onboard real-time processing in spacecrafts and aircrafts and reduces the data amount to be transmitted to ground stations to a great extent and, thus, bandwidth costs.

What is claimed is:

1. A real time SAR processing system for processing synthetic aperture radar (SAR) return signals, comprising:
   (a.) a light source for generating a coherent electromagnetic wave;
   (b.) a light modulation means for modulating an incident wave according to radar return signals and outputting a modulated wave;
   (c.) a light detection means for detecting a processed wave and generating a corresponding electrical processed image signal
   (d.) an optical processor for processing the modulated wave for radar image reconstruction wherein said optical processor comprises a spherical lens capable of imaging a processed wave to a detector plane of the light detection means, and a cylindrical lens capable of focalizing the azimuth phase history;
   wherein the light modulation means comprise a plurality of addressable pixels arranged in a two-dimensional rectangular array which are controlled based on the radar return signals; and
   wherein the light modulation means is capable of performing simultaneous amplitude and phase modulation of the incident wave according to a two-dimensional radar signal pattern, wherein one dimension corresponds to SAR range data, and wherein the other dimension corresponds to SAR azimuth signal history; and
   wherein the light modulation means and/or the light detection means are tilted with respect to an optical axis.

2. A system according to claim 1, wherein the light modulation means comprise a pixel drive circuit for writing the SAR range data corresponding to a radar pulse response in a column or line of pixels.

3. A system according to claim 1, wherein the light modulation means comprise a microdisplay or spatial light modulator for a spatial phase and/or amplitude modulation of the incident wave, and the SAR range data corresponding to individual radar pulse responses is written in pixel columns or lines of the microdisplay or spatial light modulator.

4. A system according to claim 1, further comprising a display buffer memory, wherein the SAR range data is written in the display buffer memory column by column, the data in the display buffer memory being shifted corresponding to one pixel column or a plurality of columns for each processing cycle corresponding to a radar pulse response.

5. A system according to claim 1, wherein the light detection means comprise a light sensitive area sensor.

6. A system according to claim 1, wherein the light detection means comprise a light sensitive line sensor.

7. A system according to claim 1, further comprising an image buffer to store detected processed image signals.

8. A system according to claim 1, wherein the light source comprises a laser or a collimating lens.

9. A system according to claim 1, further comprising a spatial filter or a polarizer.

10. A system according to claim 1, wherein the optical processing means comprise at least one conical lens for providing focusing power in the range direction.

11. A system according to claim 1, wherein the optical processing means comprise diffraction stop means to remove a diffraction pattern of the light source or artifacts of a radar signal carrier frequency.

12. A real time SAR processing system according to claim 1 wherein the coherent electromagnetic wave is plane.

13. A method for real time processing of synthetic aperture radar (SAR) return signals, comprising the steps:
   (a.) providing a coherent electromagnetic wave;
   (b.) modulating the coherent wave according to the radar return signals and outputting a modulated wave using a light modulation means, wherein the modulation of the coherent wave is based on a plurality of addressable pixels arranged in a two-dimensional rectangular array which are controlled by the radar return signals;
   (c.) processing optical signal of the modulated wave for radar image reconstruction using an optical processor comprising a spherical lens capable of imaging a processed wave to a detector plane of a light detection means for detecting a processed wave and generating a corresponding electrical processed image signal, and a cylindrical lens capable of focalizing the azimuth phase history; and
   (d.) detecting a processed wave and generating an electrical processed image signal corresponding to the reconstructed image;
   wherein the modulating step comprises performing simultaneous amplitude and phase modulation of the incident wave according to a two-dimensional radar signal pattern, wherein one dimension corresponds to SAR range data, and wherein the other dimension corresponds to SAR azimuth signal history; and
   wherein the light modulation means and/or the light detection means are tilted with respect to an optical axis.

14. A method according to claim 13, wherein the pixels are controlled so that SAR range data corresponding to a radar pulse response is written to a column or line of pixels, and SAR range data corresponding to a subsequent radar pulse response is written to an adjacent column or line of pixels.

15. A method according to claim 13, wherein a pixel transmittance is controlled based on an amplitude and/or phase value of a radar return signal.

* * * * *